United States Patent
Barzik et al.

(10) Patent No.: US 10,776,018 B2
(45) Date of Patent: Sep. 15, 2020

(54) EFFICIENT DISCOVERY OF SILENT READ FAILURES ON UNDERLYING MEDIA OF STORAGE SYSTEMS

(71) Applicant: INTERNATIONAL BUSINESS MACHINES CORPORATION, Armonk, NY (US)

(72) Inventors: Zah Barzik, Rishon LeZion (IL); Yair Elharrar, Ramat-Gan (IL); Maxim Kalaev, Petach Tikva (IL); Deborah A. Messing, Beit Sehemesh (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 15/626,326

(22) Filed: Jun. 19, 2017

(65) Prior Publication Data
US 2018/0364926 A1   Dec. 20, 2018

(51) Int. Cl.
*G06F 3/06* (2006.01)
*G06F 11/34* (2006.01)
*G06F 11/07* (2006.01)

(52) U.S. Cl.
CPC ............ *G06F 3/0619* (2013.01); *G06F 3/064* (2013.01); *G06F 3/067* (2013.01); *G06F 3/0653* (2013.01); *G06F 3/0656* (2013.01); *G06F 11/34* (2013.01)

(58) Field of Classification Search
None
See application file for complete search history.

(56) References Cited

U.S. PATENT DOCUMENTS

| | | |
|---|---|---|
| 5,410,546 A | 4/1995 | Boyer et al. |
| 6,799,291 B1 | 9/2004 | Kilmer et al. |
| 7,783,922 B2 | 8/2010 | Kawamura |
| 8,793,543 B2 | 7/2014 | Tai et al. |
| 9,543,035 B2 | 1/2017 | Chen |

*Primary Examiner* — Michael Alsip
(74) *Attorney, Agent, or Firm* — Griffiths & Seaton PLLC

(57) ABSTRACT

Embodiments for discovering read failures in a data storage system. Data read from underlying media of the data storage system is validated by initializing a prefix of a buffer used to read the data with a first sequence of bytes of a predefined number. The first sequence of bytes is compared to a sequence of actual bytes of the data read into the buffer. When the first sequence of bytes returns an equal value to the sequence of the actual bytes of the data read, a second sequence of bytes of the predefined number is generated and compared to a subsequent data read to determine the validity.

18 Claims, 7 Drawing Sheets

EFFICIENT DISCOVERY OF SILENT READ FAILURES ON UNDERLYING MEDIA OF STORAGE SYSTEMS

BACKGROUND OF THE INVENTION

Field of the Invention

The present invention relates in general to computing systems, and more particularly to, various embodiments for maintaining data integrity by discovering read failures in underlying media within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments are disclosed herein for discovering read failures in a data storage system. In one embodiment, by way of example only, data read from underlying media of the data storage system is validated by initializing a prefix of a buffer used to read the data with a first sequence of bytes of a predefined number. The first sequence of bytes is compared to a sequence of actual bytes of the data read into the buffer. When the first sequence of bytes returns an equal value to the sequence of the actual bytes of the data read, a second sequence of bytes of the predefined number is generated and compared to a subsequent data read to determine the validity.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
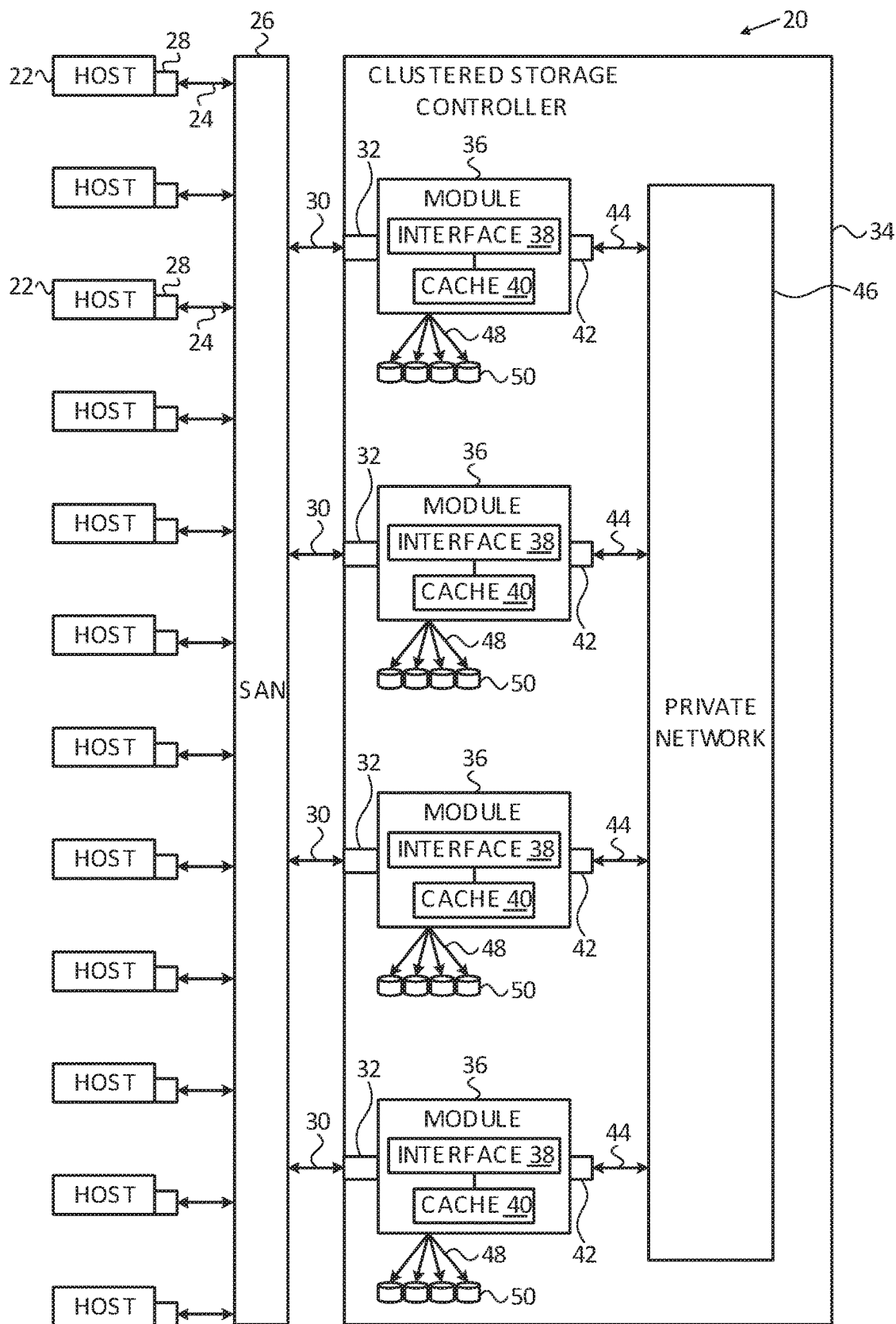
FIG. 1 illustrates a block diagram of a computer storage environment in which aspects of the present invention may be realized.

Modern storage systems use a variety of underlying storage devices, such as hard disk drives (HDDs) or solid state drives (SSDs) to store vast amounts of data. These devices are written to and read from continuously by the storage system, either with user data and/or derivatives therefrom, or with internal data and metadata. Because of the high-availability required of these storage environments, the storage systems therein are designed to overcome internal components failures, such as device (e.g., HDD/SSD) failure. In a specific type of failure, a read command issued to a device might fail and return an error code, from which the storage system can recover by recreating the missing data or recovering the data from additional sources. In other cases, however, the read failure may be "silent", or in other words, the drive or device reports a successful read even though no data has actually been read from the device. Other common failures include returning the wrong, or corrupt data by the underlying device media.

In the case of the silent failure, if the storage system cannot detect the read failure and assumes the correct data has been successfully read through to the user or host, the data ultimately returned to the user may be corrupt (i.e., data integrity issues) or may cause failure in higher levels in the storage system's code. This can cause breakdowns, for example, in data validity checks, where the storage system is not able to pin-point an exact piece of data which was not read properly from the underlying media device.

Some storage systems check validity when writing to and reading from the underlying media by using such techniques as writing cyclic redundancy check (CRC) codes. This helps resolve validity check issues previously described, however incurs heavy performance and capacity costs. Methods such as implementing CRC codes, which include additional metadata written to the device in-line with the data, may solve silent read failure and corrupt data problems, however the aforementioned performance and capacity costs needed to employ such algorithms may be undesirable. This method additionally incurs a cost by breaking data alignment between the storage system's logical block addresses and the underlying media's logical block addresses.

Other methods, in which no additional metadata is written in-line, can address silent read failures by checking that the buffer(s) used to read the data has actually been written to upon completing the read operation. A common way to do so is to initialize (or write) the buffer with predefined data (e.g., all 0xFF or all 0x00 bytes), and compare the initialized data with the actual data returned subsequent to completing the read operation. This, however, opens the possibility for a false-positive scenario in which the actual data returned is identical to the predefined data used to initialize the buffer. While using the aforementioned example of all 0x00 or 0xFF bytes may be a poor selection of predefined data (as this data will match actual read data with a relatively large probability), even using a randomly generated sequence may collide (match or return an equal value to) with actual user data.

Accordingly, the present invention introduces novel techniques to identify read failures (particularly silent read failures) from the underlying media of the storage system by initializing a prefix of the buffer(s) used to read the data with a relatively short sequence of pre-defined or random data, per each atomic read segment. In case of collision of the initialized data with actual data read into the buffer (i.e., the data values equivocate), a second relatively short sequence of random or pre-defined data is generated and compared to a subsequent data read into the buffer. While the first generated sequence on its own inherently provides a low probability of collision with the actual data read, a second failure (meaning the second sequence also returns data values which equivocate to the actual data read into the buffer) serves as a guarantee that the first collision (failure) was not a false positive—and therefore a legitimate read failure of the underlying storage media has occurred. These and additional methods and techniques will be described in detail, following.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, Input/Output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
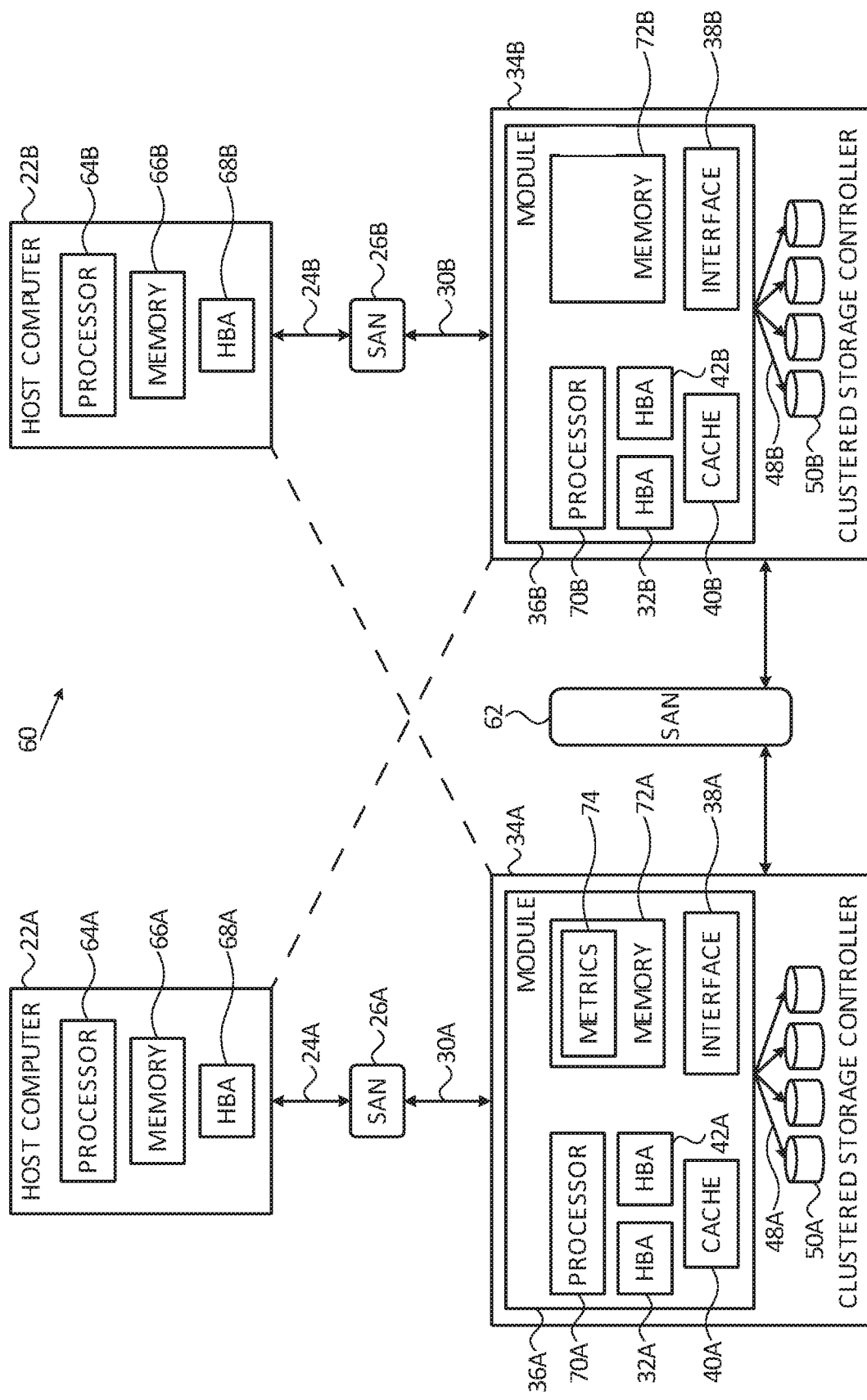
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62. In other embodiments, as will be described herein, the first host computer 22A may be directly connected to the clustered storage controller 34B, and the second host computer 22B may be directly connected to the clustered storage controller 34A via a SAN similar to SAN 62, a virtualized networking connection, or any other computer implemented medium.

Host computer 22A comprises a processor 64A, a memory 66A, and an adapter 68A. Adapter 68A is coupled to SAN 26A via a data connection 24A.

As described supra, module 36 is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (i SC SI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 3:
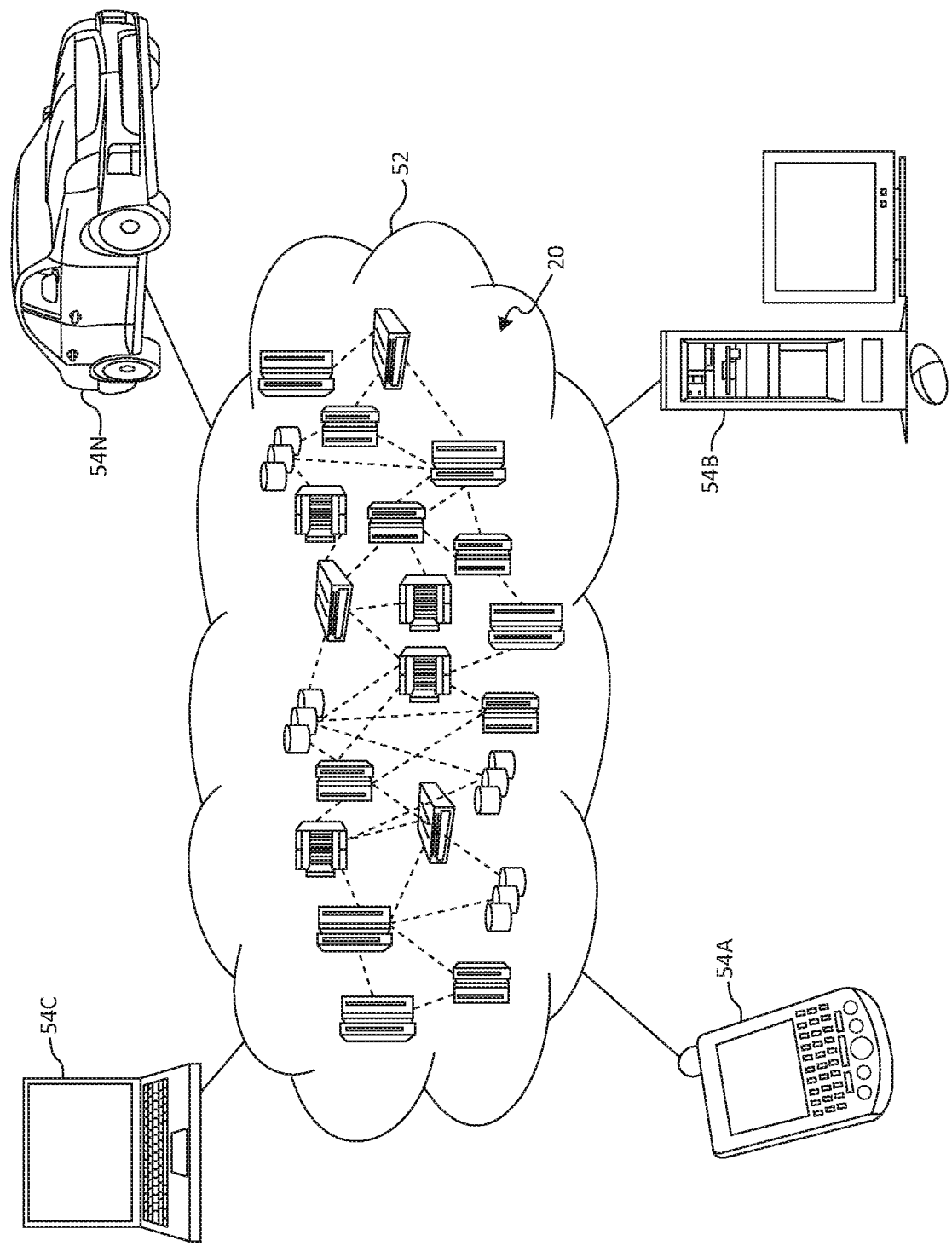
FIG. 3 illustrates a block diagram of an exemplary cloud computing environment according to embodiments of the present invention.

Referring now to FIG. 3, illustrative cloud computing environment 52 is depicted. As shown, cloud computing environment 52 comprises one or more storage subsystems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage subsystems 20, cloud computing nodes and cloud computing environment 52 can communicate with any type of computerized device over any type of network and/or network addressable connection (e.g., using a web browser).

Figure 4:
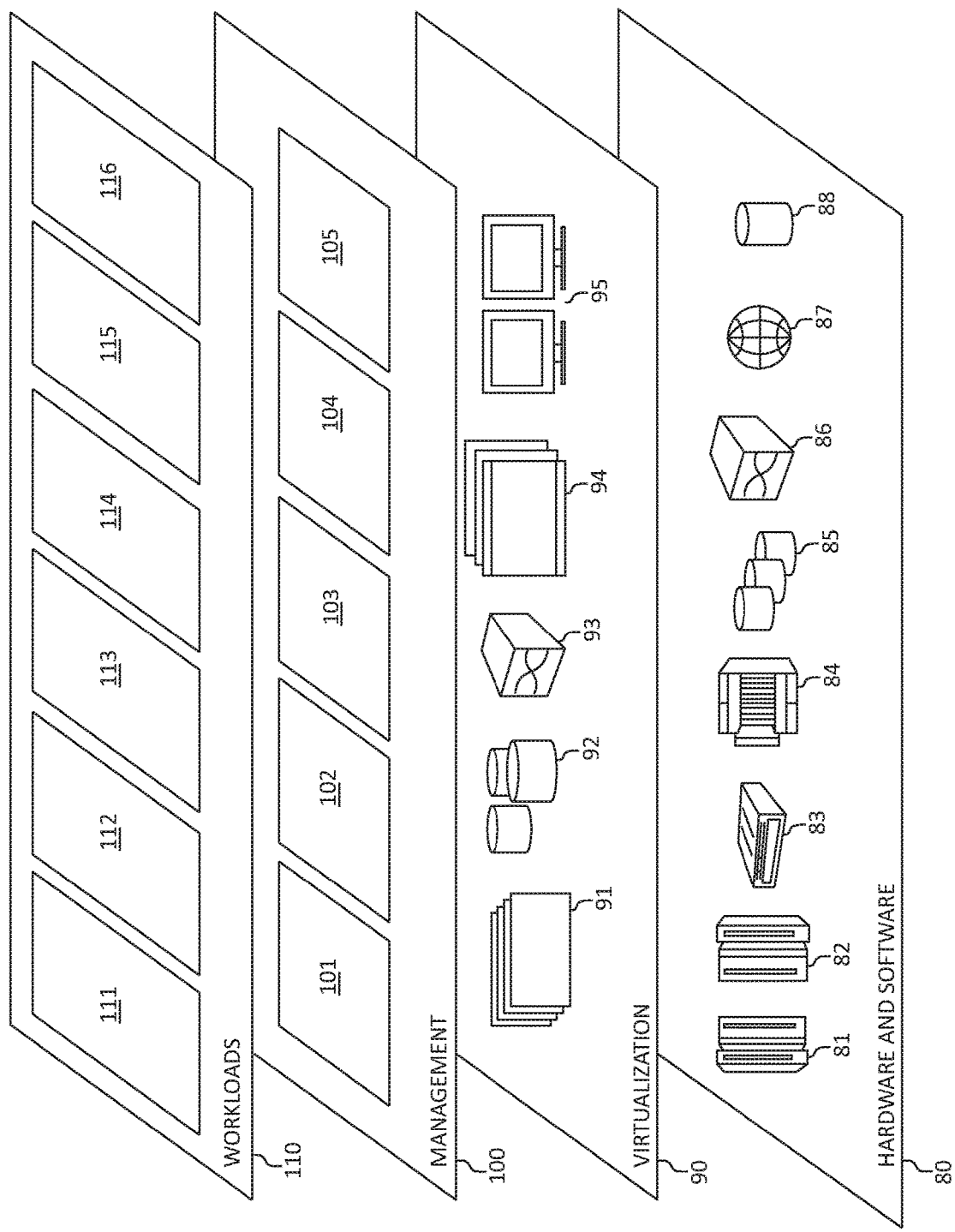
FIG. 4 illustrates a block diagram depicting abstraction model layers according to embodiments of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various data security workloads and functions 116, such as antivirus scanning workloads, or anti-malware scanning workloads. In addition, data security workloads and functions 116 may include such operations as data quarantining and/or data deleting functions. One of ordinary skill in the art will appreciate that the data security workloads and functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 5:
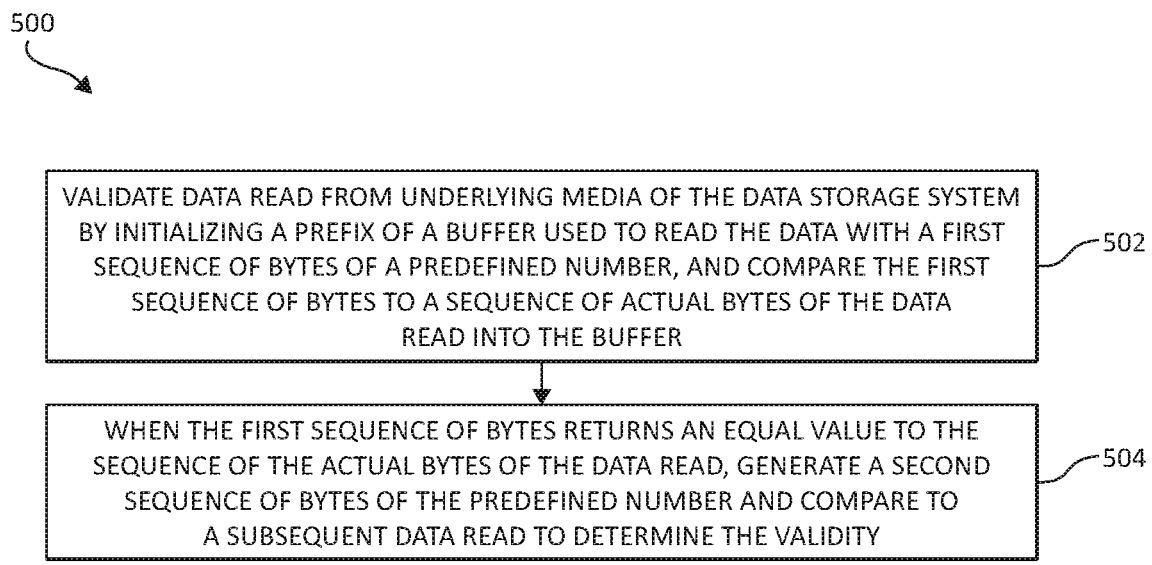
FIG. 5 illustrates a flowchart diagram illustrating an exemplary method for discovering read failures in a data storage system by a processor, by which aspects of the present invention may be implemented.

Continuing, FIG. 5 illustrates a method 500 for discovering read failures in a data storage system, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s)

implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins with validating data read from underlying media of the data storage system by initializing a prefix of a buffer used to read the data with a first sequence of bytes of a predefined number, and comparing the first sequence of bytes to a sequence of actual bytes of the data read into the buffer (step 502). When the first sequence of bytes returns an equal value to the sequence of the actual bytes of the data read, a second sequence of bytes of the predefined number is generated and compared to a subsequent data read to determine the validity (step 504). The method 500 ends.

As aforementioned, the present invention implements functionality to detect silent read failures (i.e., reads in which corrupt or wrong data has been returned however the storage system indicates a read success) by initializing a prefix of the buffer(s) used to read the data with a relatively short sequence of pre-defined or random data, per each atomic read segment. In case of collision of the initialized data with actual data read into the buffer (i.e., the data values equivocate), a second relatively short sequence of random or pre-defined data is generated and compared to a subsequent data read into the buffer. A second failure (meaning the second sequence also returns data values which equivocate to the actual data read into the buffer) serves as a guarantee that the first collision (failure) was not a false positive—and therefore a legitimate read failure of the underlying storage media has occurred. Once a read failure has been positively identified, the storage system may either recover the data and attempt to retry the read operation from the device or drive, or fail the device completely in which case the device may be phased out of the storage system, according to internal logic and other variables.

The exemplary method as described herein utilizes the fact that storage devices have a minimal block size, wherein smaller reads are not possible under such storage protocols as small computer systems interface (SCSI) or non-volatile memory express (NVMe). This size is generally either 512 B (bytes) or 4 KB (kilobytes), and thus a read task would normally be broken down into atomic reads of this block size. For the sake of brevity, the following assumes a 512 B block size, however conversion to a 4 KB (or any other) block size should be immediate.

Figure 6:
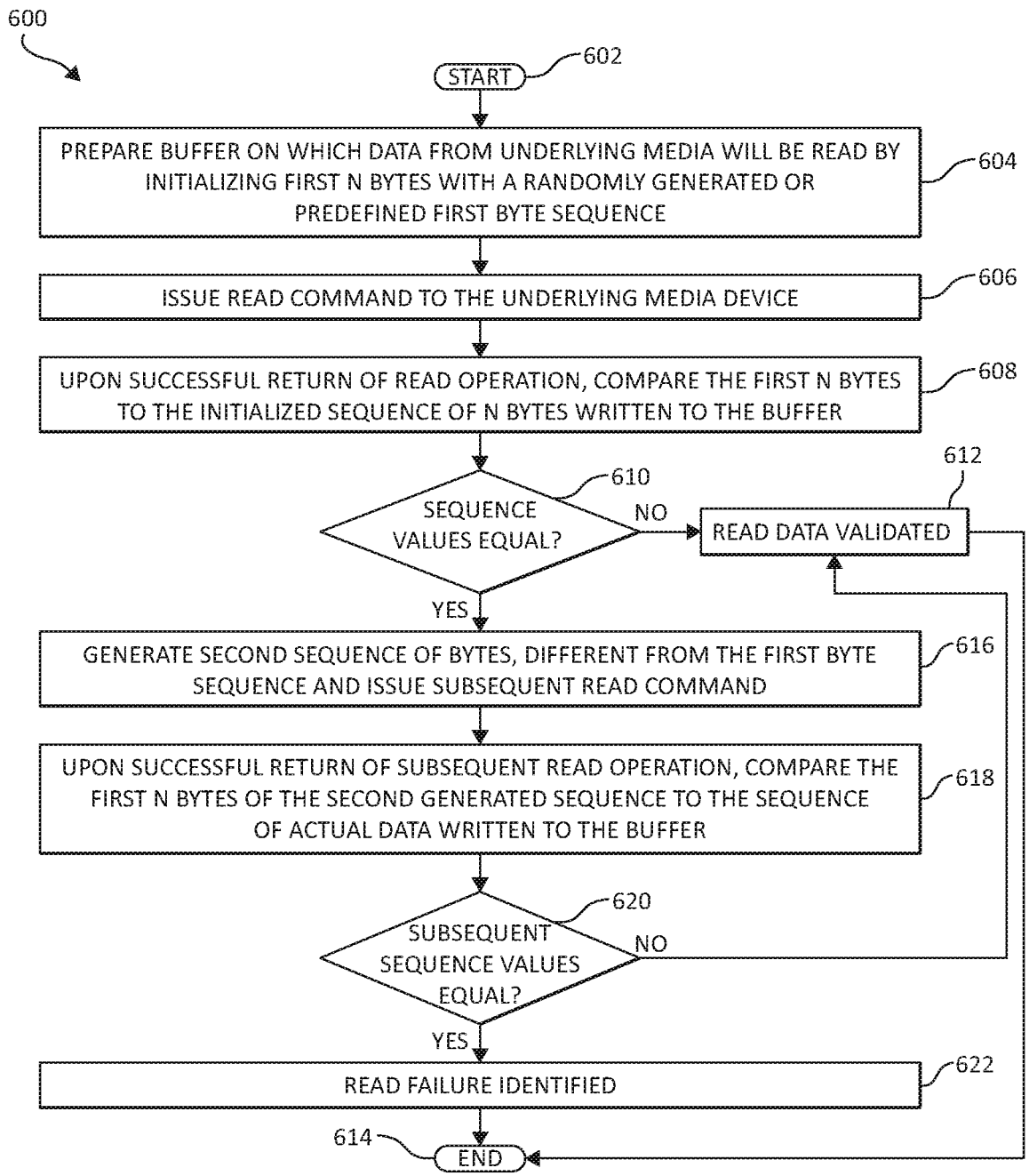
FIG. 6 illustrates an additional flowchart diagram illustrating an exemplary method for discovering read failures in a data storage system by a processor, by which aspects of the present invention may be implemented.

FIG. 6 illustrates a method 600 for discovering read failures in a data storage system, in accordance with one embodiment of the present invention. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Figure 7:
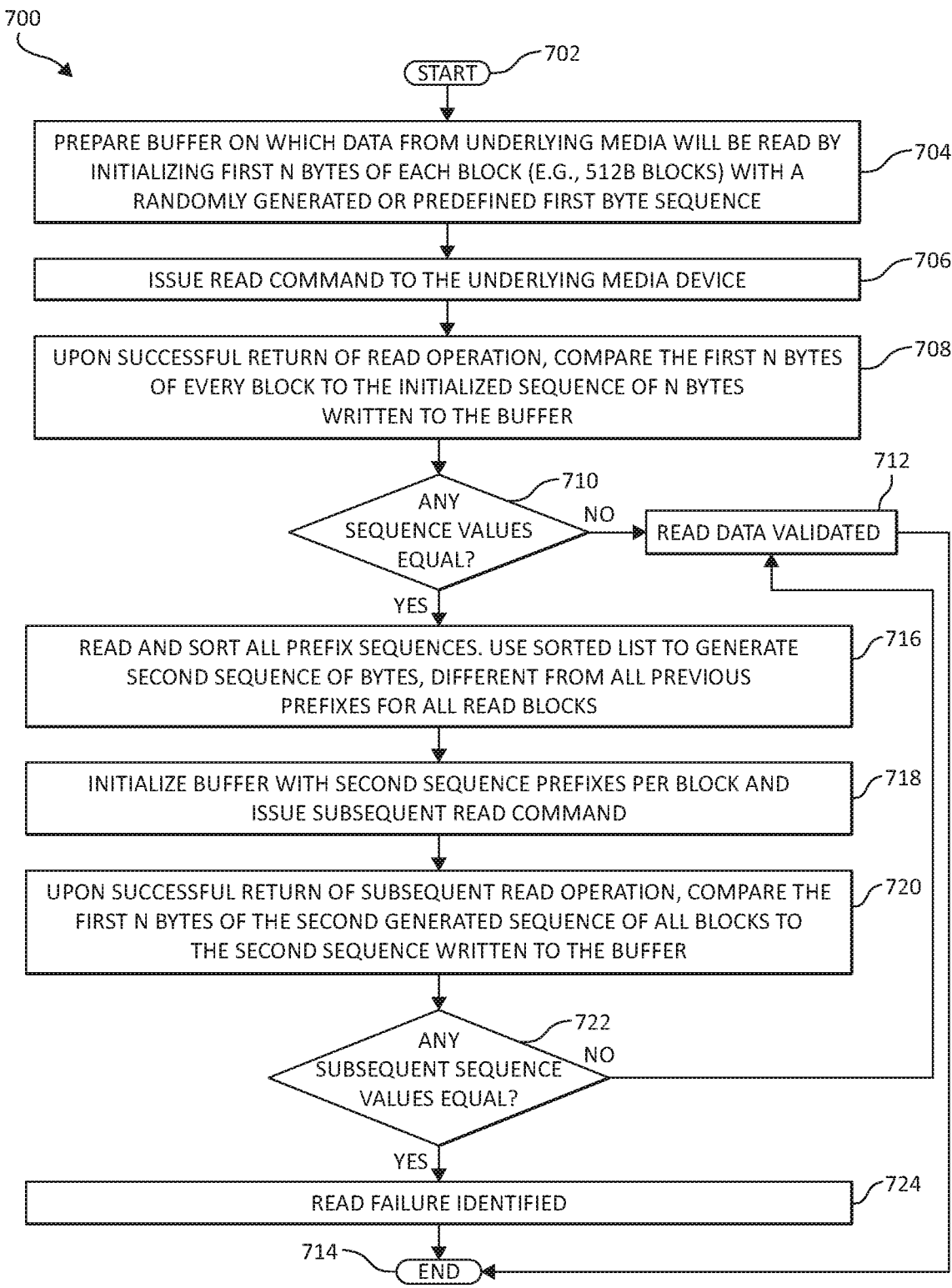
FIG. 7 illustrates still an additional flowchart diagram illustrating an exemplary method for discovering read failures in a data storage system by a processor, by which aspects of the present invention may be implemented.

The method 600 illustrates a "simple" scenario of a 512 B block read, however, as aforementioned, the procedure may be converted into reads of varying sizes, which will be further discussed in FIG. 7. Method 600 begins (step 602) with the storage system (i.e., storage subsystem 20) preparing the buffer(s) onto which the data from the underlying media (i.e., media devices 50A/50B) will be read. The storage system prepares the buffer(s) (not shown) by initializing (writing to) the buffer(s) the first N bytes (e.g., N=8 bytes) with a randomly generated or predefined byte sequence (step 604), and upon initializing the buffer, the storage system issues a read command to the underlying media device (step 606). Once the read operation returns successfully, the storage system compares the first (beginning) N bytes of the actual data read to the initialized sequence of N bytes previously written to the buffer (step 608).

At step 610, a determination is made as to whether the first N bytes of the actual data read into the buffer matches the previously initialized sequence of bytes written to the buffer prior to issuing the read operation. If the values of the bytes in the comparison are determined not to be equal, the data read from the underlying media is determined to be valid at step 612, and the method 600 ends (step 614).

Returning to step 610, if the first N bytes of the actual data read into the buffer matches the previously initialized sequence of bytes written to the buffer prior to issuing the read operation (i.e., returns an equal value to one another), the storage system generates a second sequence of N bytes which differs from the first sequence of N bytes initialized into the buffer at step 604, and issues a new (subsequent) read command (step 616). Once the subsequent read operation generated by the second read command returns successfully, the storage system again compares the first N bytes of data read into the buffer with the second sequence of N bytes initialized into the buffer in step 616 (step 618).

At step 620, another determination is made as to whether the subsequent sequence of N bytes initialized into the buffer matches (comprises an equal value to) the first sequence of N bytes of actual data read into the buffer. If, at step 620, the subsequent sequence of N bytes initialized into the buffer does not match the first sequence of N bytes of actual data read into the buffer during the second read operation, the data read may be considered valid at step 612, and the method 600 ends (step 614). Returning to step 620, if the subsequent sequence of N bytes initialized into the buffer indeed does match the first sequence of N bytes of actual data read into the buffer during the second read operation, a read failure is positively identified at step 622, the read failure is handled by the storage system in higher code-stack levels, and the method 600 ends (step 614).

FIG. 7 illustrates a method 700 for discovering read failures in a data storage system, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 illustrates an "advanced" scenario of reading a set of blocks (e.g., reading a set of 512 B blocks comprising a 1 megabyte (MB) read). Method 700 begins (step 702) with the storage system (i.e., storage subsystem 20) preparing the buffer(s) (not shown) onto which the data from the underlying media (i.e., media devices 50A/50B) will be read. The storage system prepares the buffer(s) by initializing (writing to) the buffer(s) the first N bytes (e.g., N=8 bytes) of every block (e.g., every 512 B block) to be read with a randomly generated or predefined byte sequence (step 704). In the aforementioned example of a 1 MB read, this would comprise 2K such blocks. Upon initializing the buffer, the storage system issues a read command to the underlying media device (step 706). Once the read operation returns successfully, the storage system compares the first (beginning) N bytes of every block of the actual data read to the initialized sequence of N bytes previously written to the buffer (step 708).

At step 710, a determination is made as to whether the first N bytes of any of the blocks of the actual data read into the buffer matches the previously initialized sequence of bytes written to the buffer prior to issuing the read operation. If the values of the bytes in the comparison are determined not to be equal for any of the blocks, the data read from the underlying media is determined to be valid at step 712, and the method 700 ends (step 714).

Returning to step 710, if the first N bytes of any of the blocks of the actual data read into the buffer matches the previously initialized sequence of bytes written to the buffer prior to issuing the read operation (i.e., returns an equal value to any one of the blocks read), the storage system reads all 2K 4 B prefix sequences of the actual data read and sorts the prefix sequences into a list in O(n) operations, relying on the prefixes all being 32 bit integers (e.g., using Radix-Sort). The sorted list is then used to generate a unique second sequence (of 4 B) which differs from all 4 B prefixes of all the read blocks (step 716). This unique second sequence of blocks may be generated in a variety of ways and is an O(n) operation since the number of bits is known, and blocked by 32 bits. Two additional methods for generating the unique sequence are also shown as examples as follows.

An array of n bits may be defined, each representing a unique integer in a predefined N-sized range. On a single run over the set of all read blocks, the first bytes may be read from each block, and if any of the bytes correspond to an integer in the array, a respective bit for the block is turned on. After this single run, the bit-array is either all marked or has at least one bit left turned off. If all corresponding bits are turned on, this means that all N values appear in the read block set, so any integer outside the N-sized range would be unique (e.g., n+1). Otherwise, any of the unmarked bits may be selected and the integer this bit represents may be chosen. This method runs well in O(n) space and O(n) time complexities.

In another example, a random 32 bit integer may be selected and treated as a 64 bit integer, wherein the integer is verified it does not appear in the array. If the integer does appear in the bit-array, it may either be incremented by a 32 bit constant, incremented by a 32 bit random value, or a new random value may be generated. When repeated, if the number is incremented by either a random non-zero number or a constant, and for proportional values of N, the 64 bit integer will not wrap, and as such is guaranteed to generate a unique integer within N iterations having a total time complexity of $O(n^2)$ and space complexity of $O(1)$.

Returning to step 718 in method 700, the buffer(s) are initialized by writing in the second sequence of N bytes (i.e., the uniquely generated 4K prefixes per 512 B block), and a new (subsequent) read command is issued. Once the subsequent read operation generated by the second read command returns successfully, the storage system again compares the first N bytes of all blocks of the actual data read into the buffer (compares the first 4 bytes of all 512 blocks of actual data read) with the second sequence of N bytes initialized into the buffer in step 718 (step 720).

At step 722, another determination is made as to whether the subsequent sequence of N bytes initialized into the buffer matches (comprises an equal value to) the first sequence of N bytes of actual data of any of the blocks read into the buffer. If, at step 722, the subsequent sequence of N bytes initialized into the buffer does not match the first sequence of N bytes of actual data of any of the blocks read into the buffer during the second read operation, the data read may be considered valid at step 712, and the method 700 ends (step 714). Returning to step 722, if the subsequent sequence of N bytes initialized into the buffer indeed does match the first sequence of N bytes of actual data of any of the blocks read into the buffer during the second read operation, a read failure is positively identified at step 724, the read failure is handled by the storage system in higher code-stack levels, and the method 700 ends (step 714).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for discovering read failures in a data storage system, by a processor device, comprising:
    validating data read from underlying media of the data storage system by initializing a prefix of a buffer used to read the data with a first sequence of bytes of a predefined number, attempting to read the data from the underlying media a first time, and comparing the first sequence of bytes to a first sequence of actual bytes in the buffer once the storage system indicates the data has been successfully read; wherein, when the first sequence of bytes returns an equal value to the first sequence of the actual bytes, a preliminary indication of a read failure of the data is identified; and
    responsive to the preliminary indication of the read failure of the data, re-initializing the prefix of the buffer with a second sequence of bytes of the predefined number differing from the first sequence of bytes, attempting to re-read the data from the underlying media a second time, and comparing the second sequence of bytes to a second sequence of actual bytes in the buffer when the storage system indicates the data has been successfully re-read to confirm the read failure and therefore determine the validity of the data wherein, when the first and second sequence of bytes both return an equal value to the first and second sequence of actual bytes in the buffer, respectively, the read failure is positively identified notwithstanding whether the data read at the first time and the data read at the second time comprise identical data.

2. The method of claim 1, wherein the first and second sequence of bytes each comprise a predefined or random sequence of bytes of the predefined number.

3. The method of claim 2, further including performing each of:
- preparing the buffer by initializing the first sequence of N bytes, wherein N is the predefined number;
- issuing a read command at the first time to the underlying media; and
- upon the read command returning a successful read operation, comparing the first sequence of N bytes to a beginning sequence of N bytes of the first sequence of actual bytes in the buffer.

4. The method of claim 3, wherein comparing the second sequence of bytes subsequent to the attempted data re-read further includes issuing a subsequent read command at the second time to the underlying media, and comparing the second sequence of bytes to the beginning sequence of N bytes of the second sequence of actual bytes in the buffer upon the subsequent read command returning the successful read operation.

5. The method of claim 3, further including, for reading a set of blocks, initializing the buffer with the first sequence of N bytes for each block of a predetermined size, and comparing the first sequence of N bytes to the beginning sequence of the N bytes of the first sequence of actual bytes for each block of the set of blocks in the buffer.

6. The method of claim 5, further including, when the first sequence of N bytes returns an equal value to the beginning sequence of N byes of the first sequence of actual sequence of bytes in buffer for any blocks of the set of blocks, generating the second sequence of bytes for each of the blocks which differs from all prefixes used in the sequence of N bytes of the first sequence of actual bytes of each of the blocks of the set of blocks; and
- comparing the second sequence of N bytes to the beginning sequence of N bytes of the second sequence of actual sequence of bytes in the buffer for each block in the subsequent attempted data re-read.

7. A system for discovering read failures in a data storage system, the system comprising:
- a processor device executing instructions stored in a memory, wherein the processor device:
  - validates data read from underlying media of the data storage system by initializing a prefix of a buffer used to read the data with a first sequence of bytes of a predefined number, attempting to read the data from the underlying media a first time, and comparing the first sequence of bytes to a first sequence of actual bytes in the buffer once the storage system indicates the data has been successfully read; wherein, when the first sequence of bytes returns an equal value to the first sequence of the actual bytes, a preliminary indication of a read failure of the data is identified; and
  - responsive to the preliminary indication of the read failure of the data, re-initializes the prefix of the buffer with a second sequence of bytes of the predefined number differing from the first sequence of bytes, attempting to re-read the data from the underlying media a second time, and comparing the second sequence of bytes to a second sequence of actual bytes in the buffer when the storage system indicates the data has been successfully re-read to confirm the read failure and therefore determine the validity of the data wherein, when the first and second sequence of bytes both return an equal value to the first and second sequence of actual bytes in the buffer, respectively, the read failure is positively identified notwithstanding whether the data read at the first time and the data read at the second time comprise identical data.

8. The system of claim 7, wherein the first and second sequence of bytes each comprise a predefined or random sequence of bytes of the predefined number.

9. The system of claim 8, wherein the processor device performs each of:
- preparing the buffer by initializing the first sequence of N bytes, wherein N is the predefined number;
- issuing a read command at the first time to the underlying media; and
- upon the read command returning a successful read operation, comparing the first sequence of N bytes to a beginning sequence of N bytes of the first sequence of actual bytes in the buffer.

10. The system of claim 9, wherein comparing the second sequence of bytes subsequent to the attempted data re-read further includes issuing a subsequent read command at the second time to the underlying media, and comparing the second sequence of bytes to the beginning sequence of N bytes of the second sequence of actual bytes in the buffer upon the subsequent read command returning the successful read operation.

11. The system of claim 9, wherein the processor device, for reading a set of blocks, initializes the buffer with the first sequence of N bytes for each block of a predetermined size, and compares the first sequence of N bytes to the beginning sequence of the N bytes of the first sequence of actual bytes for each block of the set of blocks in the buffer.

12. The system of claim 11, wherein the processor device, when the first sequence of N bytes returns an equal value to the beginning sequence of N byes of the first sequence of actual sequence of bytes in buffer for any blocks of the set of blocks, generates the second sequence of bytes for each of the blocks which differs from all prefixes used in the sequence of N bytes of the first sequence of actual bytes of each of the blocks of the set of blocks; and
- compares the second sequence of N bytes to the beginning sequence of N bytes of the second sequence of actual sequence of bytes in the buffer for each block in the subsequent attempted data re-read.

13. A computer program product for discovering read failures in a data storage system, by a processor device, the computer program product embodied on a non-transitory computer-readable storage medium having computer-readable program code portions stored therein, the computer-readable program code portions comprising:
- an executable portion that validates data read from underlying media of the data storage system by initializing a prefix of a buffer used to read the data with a first sequence of bytes of a predefined number, attempting to read the data from the underlying media a first time, and comparing the first sequence of bytes to a first sequence of actual bytes in the buffer once the storage system indicates the data has been successfully read; wherein, when the first sequence of bytes returns an equal value to the first sequence of the actual bytes, a preliminary indication of a read failure of the data is identified; and
- an executable portion that, responsive to the preliminary indication of the read failure of the data, re-initializes the prefix of the buffer with a second sequence of bytes of the predefined number differing from the first sequence of bytes, attempting to re-read the data from the underlying media a second time, and comparing the second sequence of bytes to a second sequence of actual bytes in the buffer when the storage system indicates the data has been successfully re-read to confirm the read failure and therefore determine the validity of the data; wherein, when the first and second sequence of bytes both return an equal value to the first and second sequence of actual bytes in the buffer, respectively, the read failure is positively identified notwithstanding whether the data read at the first time and the data read at the second time comprise identical data.

14. The computer program product of claim 13, wherein the first and second sequence of bytes each comprise a predefined or random sequence of bytes of the predefined number.

15. The computer program product of claim 14, further including an executable portion that performs each of:
  preparing the buffer by initializing the first sequence of N bytes, wherein N is the predefined number;
  issuing a read command at the first time to the underlying media; and
  upon the read command returning a successful read operation, comparing the first sequence of N bytes to a beginning sequence of N bytes of the first sequence of actual bytes in the buffer.

16. The computer program product of claim 15, wherein comparing the second sequence of bytes subsequent to the attempted data re-read further includes issuing a subsequent read command at the second time to the underlying media, and comparing the second sequence of bytes to the beginning sequence of N bytes of the second sequence of actual bytes in the buffer upon the subsequent read command returning the successful read operation.

17. The computer program product of claim 15, further including an executable portion that, for reading a set of blocks, initializes the buffer with the first sequence of N bytes for each block of a predetermined size, and compares the first sequence of N bytes to the beginning sequence of the N bytes of the first sequence of actual bytes for each block of the set of blocks in the buffer.

18. The computer program product of claim 17, further including an executable portion that, when the first sequence of N bytes returns an equal value to the beginning sequence of N byes of the first sequence of actual sequence of bytes in buffer for any blocks of the set of blocks, generates the second sequence of bytes for each of the blocks which differs from all prefixes used in the sequence of N bytes of the first sequence of actual bytes of each of the blocks of the set of blocks; and
  compares the second sequence of N bytes to the beginning sequence of N bytes of the second sequence of actual sequence of bytes in the buffer for each block in the subsequent attempted data re-read.

* * * * *